(12) United States Patent
Cavanna et al.

(10) Patent No.: US 9,909,488 B2
(45) Date of Patent: Mar. 6, 2018

(54) METHOD TO DETERMINE THE INJECTION PATTERN IN THE INTAKE STROKE OF THE COMBUSTION CYCLE OF THE CYLINDERS OF A DIRECT-INJECTION INTERNAL COMBUSTION ENGINE

(71) Applicant: Magneti Marelli S.p.A., Corbetta (IT)

(72) Inventors: Filippo Cavanna, Bologna (IT); Riccardo Lanzoni, Imola (IT); Marco Morelli, Baschi-Terni (IT); Alessandro Musi, Bologna (IT); Fabio Panini, Modena (IT); Fabio Sensi, Casalecchio di Reno (IT)

(73) Assignee: Magneti Marelli S.p.A., Corbetta (IT)

( * ) Notice: Subject to any disclaimer, the term of this patent is extended or adjusted under 35 U.S.C. 154(b) by 274 days.

(21) Appl. No.: 14/706,059

(22) Filed: May 7, 2015

(65) Prior Publication Data

US 2015/0322909 A1 Nov. 12, 2015

(30) Foreign Application Priority Data

May 9, 2014 (IT) .............................. BO2014A0277

(51) Int. Cl.
*F02M 65/00* (2006.01)
*F02B 5/02* (2006.01)
(Continued)

(52) U.S. Cl.
CPC .............. *F02B 5/02* (2013.01); *F02D 41/047* (2013.01); *F02D 41/402* (2013.01); *F02D 41/06* (2013.01); *Y02T 10/44* (2013.01)

(58) Field of Classification Search
CPC .......... F02B 5/02; F02D 41/047; F02D 41/06; F02D 41/402; Y02T 10/44
See application file for complete search history.

(56) References Cited

U.S. PATENT DOCUMENTS 5,979,397 A * 11/1999 Machida ............. F02D 41/3023
123/295
7,210,449 B2 * 5/2007 Beer ..................... F02D 35/027
123/299

(Continued)

FOREIGN PATENT DOCUMENTS

DE     19829308 A1    3/1999
DE     10014553 A1    10/2001

(Continued)

OTHER PUBLICATIONS

Search Report dated Aug. 27, 2014 issued in Italian Patent Application No. BO20140277.

(Continued)

*Primary Examiner* — Freddie Kirkland, III
(74) *Attorney, Agent, or Firm* — Howard & Howard Attorneys PLLC (57) ABSTRACT

A method to determine the injection pattern in the intake stroke of the combustion cycle of the cylinders of a direct-injection internal combustion engine, which includes determining the overall quantity of fuel to be injected for each combustion cycle of each cylinder during the intake stroke; determining the maximum quantity of fuel to be injected for each partial injection as a function of the value of the start of injection angle, of the speed and of the load of the internal combustion engine; and determining the number of partial injections and the objective quantity to be injected for each partial injection as a function of the quantity of fuel to be injected for each combustion cycle of each cylinder during the intake stroke and of the maximum quantity of fuel to be injected for each partial injection.

6 Claims, 6 Drawing Sheets

(51) Int. Cl.
*F02D 41/04* (2006.01)
*F02D 41/40* (2006.01)
*F02D 41/06* (2006.01)

(56) References Cited

U.S. PATENT DOCUMENTS

| | | | | |
|---|---|---|---|---|
| 8,775,057 B2* | 7/2014 | Arihara | ............... | F02D 35/026 |
| | | | | 123/299 |
| 8,904,997 B2* | 12/2014 | Watanabe | ............. | F02D 41/402 |
| | | | | 123/299 |
| 2004/0159093 A1* | 8/2004 | Pott | ................... | F02D 41/0245 |
| | | | | 60/274 |
| 2006/0278196 A1* | 12/2006 | Beer | ................... | F02D 35/027 |
| | | | | 123/299 |
| 2007/0056553 A1* | 3/2007 | Kohler | ................ | F02B 23/101 |
| | | | | 123/295 |
| 2008/0087251 A1* | 4/2008 | Idogawa | ............ | F02D 41/0255 |
| | | | | 123/445 |
| 2009/0125212 A1* | 5/2009 | Kurashima | ........... | F02D 41/062 |
| | | | | 701/103 |
| 2011/0307164 A1* | 12/2011 | Arihara | ............... | F02D 35/026 |
| | | | | 701/105 |
| 2013/0000606 A1* | 1/2013 | Watanabe | ............. | F02D 41/402 |
| | | | | 123/478 |
| 2015/0027403 A1* | 1/2015 | Porten | ................... | F02D 41/062 |
| | | | | 123/299 |
| 2016/0025058 A1* | 1/2016 | Cavanna | ............. | F02D 41/3005 |
| | | | | 123/305 |

FOREIGN PATENT DOCUMENTS

| | | |
|---|---|---|
| DE | 10256474 B3 | 5/2004 |
| DE | 102010011105 A1 | 9/2011 |
| DE | 102011086948 A1 | 5/2013 |
| EP | 2058500 A2 | 5/2009 |
| EP | 2395220 A1 | 12/2011 |
| JP | 2002161790 A | 6/2002 |
| WO | 2011110208 A1 | 9/2011 |

OTHER PUBLICATIONS

Communication dated Oct. 20, 2015 enclosing European Search Report dated Oct. 14, 2015 issued in European Patent Application No. 15 16 7046.

* cited by examiner

METHOD TO DETERMINE THE INJECTION PATTERN IN THE INTAKE STROKE OF THE COMBUSTION CYCLE OF THE CYLINDERS OF A DIRECT-INJECTION INTERNAL COMBUSTION ENGINE

TECHNICAL FIELD

The present invention relates to a method to determine the injection pattern in the intake stroke of the combustion cycle of the cylinders of a direct-injection internal combustion engine.

PRIOR ART

A spark-ignited, direct-injection internal combustion engine comprises a number of cylinders, each of which is provided with a respective piston, which cyclically slides within the cylinder and is mechanically connected by means of a connecting rod to a crankshaft to transmit to the drive shaft itself the force generated by the combustion within the cylinder, with a respective injector partially arranged inside the cylinder and with a respective spark plug, which is cyclically controlled by an electronic control unit to produce a spark between its electrodes and thus determine the ignition of the compressed gases in the cylinder itself. The internal combustion engine further comprises an intake manifold, which is connected to each cylinder by means of one or more intake valves, and an exhaust manifold, which is connected to each cylinder by means of one or more exhaust valves and which leads to an emission pipe to emit the gases produced by the combustion into the atmosphere.

The four-stroke combustion cycle of each cylinder consists of four strokes in sequence: an intake stroke, a compression stroke, an expansion stroke and an exhaust stroke. At the end of each combustion cycle, two complete revolutions will have been completed by the drive shaft, thus covering a rotation equal to 720°. The piston is initially at top dead center and, during the intake stroke, descends to bottom dead center by generating a vacuum in the cylinder which, as the respective intake valve opens, recalls air from the intake pipe covering half a revolution of the drive shaft and exploring an angle from 0° to 180°. Fuel is injected in the combustion chamber during the intake stroke and/or during the subsequent compression stroke. During the subsequent compression stroke, the piston rises from bottom dead center to top dead center, thus compressing the air and fuel mixture which is in the cylinder, causing an increase of pressure and of temperature, covering half a revolution of the drive shaft and exploring an angle from 180° to 360°.

During the expansion stroke, the electrodes of the spark plug produce the spark which ignites the air and fuel mixture in the cylinder starting the combustion itself, which produces an increase of temperature and pressure in addition to being the only step of the combustion cycle in which useful work is generated. The piston is pushed from top dead center to bottom dead center by covering half a revolution of the drive shaft and exploring an angle from 360° to 540°. Finally, in the exhaust stroke, the piston is at bottom dead center again and moves up to top dead center to eject the burnt gases, which are introduced into the exhaust pipe, by means of the respective exhaust valve, covering half a revolution of the drive shaft and exploring an angle from 540° to 720°.

The overall quantity of fuel to be injected for each four-stroke combustion cycle can be determined as a function of the torque to be delivered to the drive wheels which determines the quantity of air that the engine must aspirate. The overall quantity of fuel to be injected for each four-stroke combustion cycle of each cylinder may be injected, alternatively, either during the intake stroke, or during the compression stroke, or even during both the intake stroke and the compression stroke.

The definition of the injection pattern (i.e. the determination of the stroke or strokes of the combustion cycle during which the quantity of fuel is either completely or partially injected) is extremely critical to be able guarantee a correct mixing of air and fuel and to prevent the fuel from fouling the crown of the piston or the walls of the cylinder and causing the formation of particulate.

DESCRIPTION OF THE INVENTION

It is the object of the present invention to provide a method to determine the injection pattern in the intake stroke of the combustion cycle of the cylinders of a direct-injection internal combustion engine, which method is free from the drawbacks described above and which, in particular, is easy and cost-effective to implement.

It is a further object of the present invention to provide a control unit suited to determine the injection pattern in the intake stroke of the combustion cycle of the cylinders of a direct-injection internal combustion engine, which is free from the drawbacks of the prior art.

According to the present invention, a control unit and a method for determining the injection pattern in the intake stroke of the combustion cycle of the cylinders of a direct-injection internal combustion engine as disclosed in the appended claims.

BRIEF DESCRIPTION OF THE DRAWINGS

The present invention will now be described with reference to the accompanying drawings, which show a non-limiting embodiment thereof, in which.

PREFERRED EMBODIMENTS OF THE INVENTION

Figure 1:
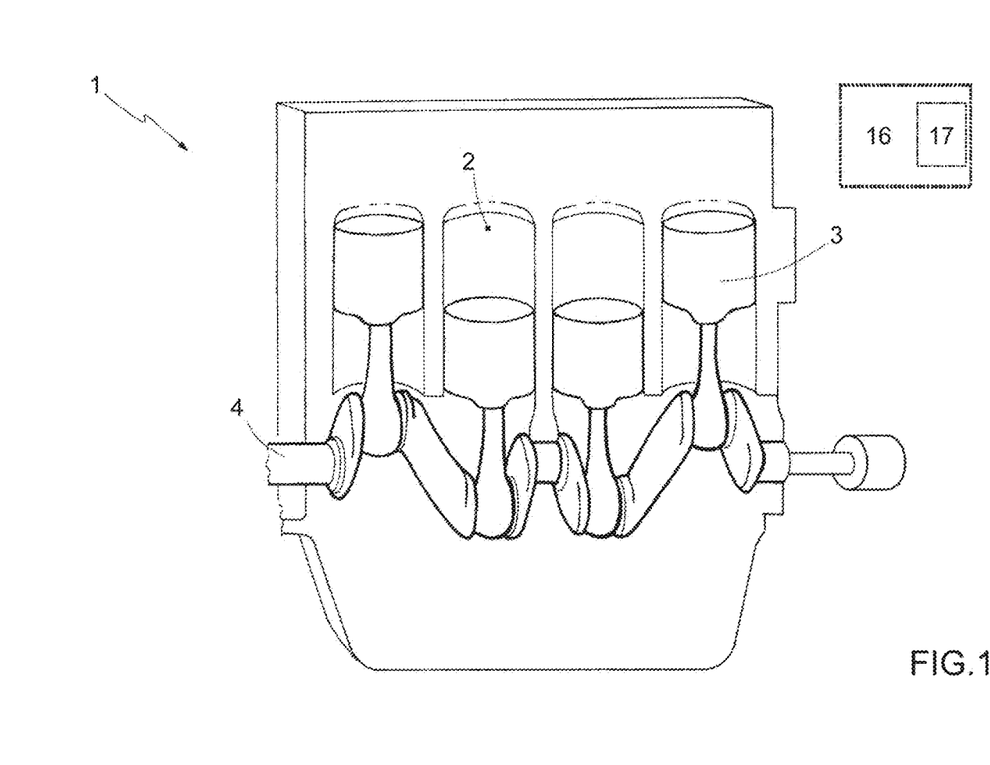
FIG. 1 is diagrammatic view of a direct-injection internal combustion engine provided with a control unit which implements the method to determine the injection pattern in the intake/compression strokes object of the present invention.

In FIG. 1, reference numeral 1 indicates as a whole a spark-ignited internal combustion engine comprising four cylinders 2 in a straight arrangement. Each cylinder 2 comprises a respective piston 3 mechanically connected by means of a connecting rod to a crankshaft 4 for transmitting the force generated by the combustion in the cylinder 2 to the drive shaft 4 itself.

Figure 2:
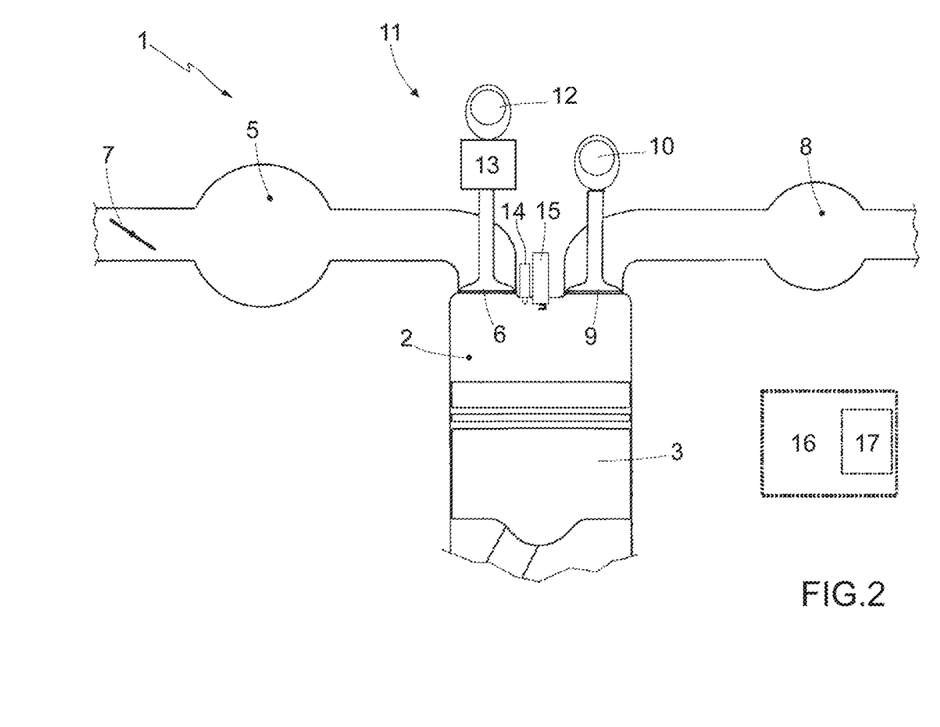
FIG. 2 is a diagrammatic view of a cylinder of the internal combustion engine in FIG. 1.

As shown in FIG. 2, the internal combustion engine 1 comprises an intake manifold 5, which is connected to each cylinder 2 by means of two intake valves 6 (of which only one is shown in FIG. 2) and receives fresh air (i.e. air from the outside environment) through a butterfly valve 7 moveable between a closing position and a maximum opening position. Furthermore, the internal combustion engine 1 comprises an exhaust manifold 8, which is connected to each cylinder 2 by means of two exhaust valves 9 (only one of which is shown in FIG. 2) which leads into an emission pipe (not shown) to emit the gases produced by the combustion into the atmosphere.

The position of each exhaust valve 9 is directly controlled by a camshaft 10 which receives motion from the drive shaft 4; instead, the position of the intake valves 6 may be controlled by a generic valve opening control device 11 which controls the intake valves 6 managing the opening and lift angle so as to control the torque delivered by means of the intake valves 6. The valve opening control device 11 uses a traditional camshaft 12 which receives motion from the drive shaft 4 and for each intake valve 6 may comprise an electrically controlled hydraulic actuator 13 (i.e. controlled by means of a solenoid valve), which is interposed between a stem of the intake valve 6 and the camshaft 12. By appropriately controlling each hydraulic actuator 13, it is possible to adjust the motion transmitted by the camshaft 12 to the intake valve stem 6, and it is thus possible to adjust the actual lift of the intake valve 6. Thus, the action of the control device 11 may allow to vary the actual lift of each intake valve 6 independently from the other intake valves 6, for each cylinder 2 and engine cycle.

A corresponding injector 14 is provided for each cylinder 2; according to the embodiment shown in FIG. 2, the injection is of the direct type and therefore each injector 14 is partially arranged inside the cylinder 2. According to an alternative embodiment (not shown), and limitedly to the application of the part concerning the intake valve INT of the present invention only, the injection is of the indirect type, and therefore each injector 14 is arranged upstream of the cylinder 2 in an intake pipe which connects the intake manifold 5 to the cylinder 2.

Furthermore, each cylinder 2 comprises a spark plug 15, which is arranged through the top of the cylinder 2 in central position between the intake valves 5 and the exhaust valves 9 and is cyclically activated to determine the ignition of the compressed gases in the cylinder 2 at the end of each compression stroke.

The engine 1 comprises a control unit 16, which governs the operation of the internal combustion engine 1 and, among other things, controls the spark plugs 15 to determine the ignition of the compressed gases in each cylinder 2. The control unit 16 comprises a memory 17, in which a series of maps, which provide the control values of the spark plugs 15 as a function of the current engine point, are stored; in particular, the maps stored in the memory 17 provide a standard spark advance for each spark plug 15 (i.e. for each cylinder 2).

Figure 3:
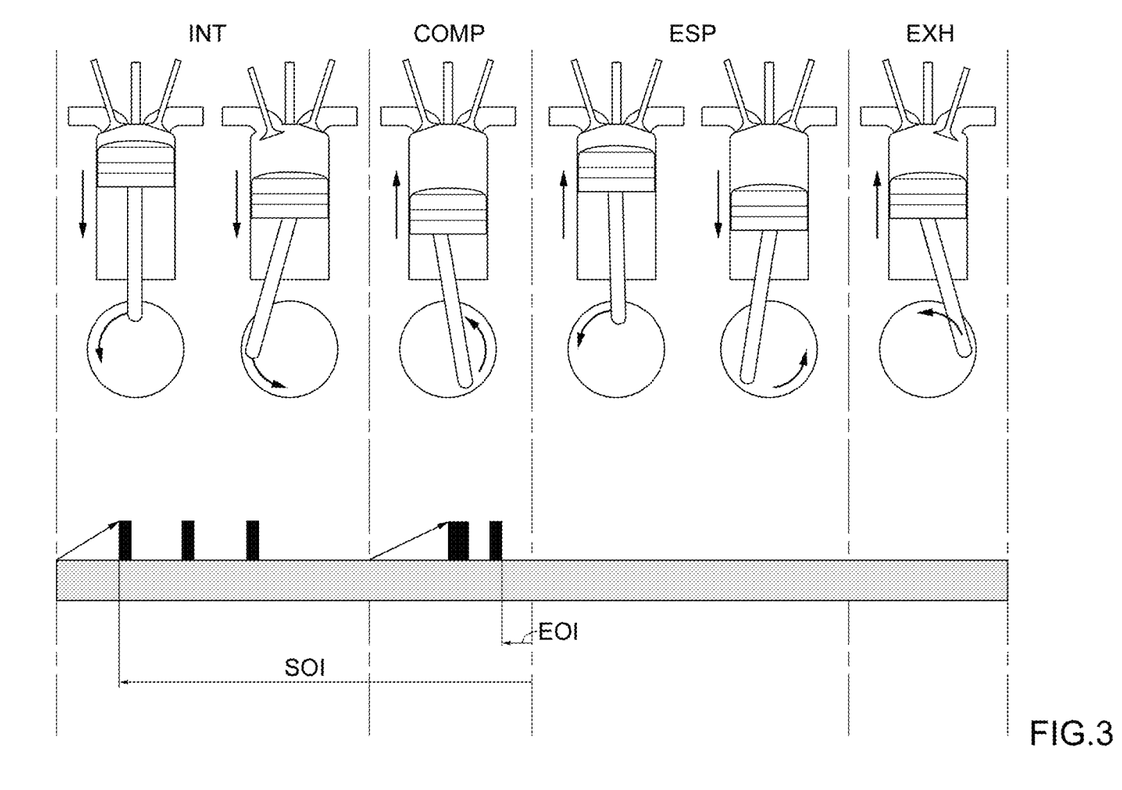
FIG. 3 diagrammatically shows the various strokes of a combustion cycle in the cylinder in FIG. 2 in sequence.

FIG. 3 shows the four-stroke combustion cycle of each cylinder 2. The complete combustion cycle is implemented by the sequence of four strokes: an intake stroke INT, a compression stroke COMP, an expansion stroke ESP and an exhaust stroke EXH. At the end of each combustion cycle two complete revolutions will have been completed by the drive shaft 4, thus covering a rotation equal to 720°.

During the intake stroke INT, the piston 3 is initially at top dead center PMS and descends to bottom dead center PMI generating a vacuum in the cylinder 2, which vacuum, as the respective intake valve 6 opens, recalls air from the intake manifold 5 covering half a revolution of the drive shaft 4 and exploring an angle from 0° to 180°.

Fuel is injected into the combustion chamber during the described intake stroke ASP and/or the subsequent compression stroke COMP.

In the compression stroke COMP, the piston 3 rises from bottom dead center PMI to top dead center PMS, thus compressing the air and fuel mixture which is in the cylinder 2 and causing an increase of pressure and of temperature, covering half a revolution of the drive shaft 4 (so as to complete the first complete revolution of the drive shaft 4) and exploring an angle from 180° to 360°.

During the expansion stroke ESP, the electrodes of the spark plug 15 cause a spark which ignites the air and fuel mixture in the cylinder 2 starting the combustion itself, which produces an increase of temperature and pressure in addition to being the only step of the combustion cycle in which useful work is generated. The piston 3 is pushed from top dead center PMS to bottom dead center PMI by covering half a revolution of the drive shaft 4 and exploring an angle from 360° to 540°.

In the exhaust stroke EXH, the piston 3 is at bottom dead center PMI again and moves up to top dead center PMS to eject the burnt gases, which are introduced into the exhaust pipe, by means of the respective exhaust valve 9, covering half a revolution of the drive shaft 4 (so as to complete the second complete revolution of the drive shaft 4) and exploring an angle from 540° to 720°.

The strategy implemented by the control unit 16 to determine the number of partial injections, the quantity of fuel to be injected for each partial injection and the period between two subsequent partial injections during the intake stroke INT is described below.

The control unit 16 is configured to determine the overall quantity $Q_{fuel}$ of fuel to be injected for each combustion cycle of each cylinder 2 as a function of the request for torque C to be delivered to the drive wheels which determines the quantity of air that the internal combustion engine 1 must aspirate. Having determined the overall quantity of fuel $Q_{fuel}$ to be injected for each combustion cycle of each cylinder 2, the control unit 16 is configured to determine, respectively, the quantity of fuel $Q_{fuel\_int}$ to be injected for each combustion cycle of each cylinder 2 during the intake stroke INT, the quantity $Q_{fuel\_comp}$ of fuel to be injected for each combustion cycle of each cylinder 2 during the compression stroke COMP and, possibly, also the quantity $Q_{fuel\_esp}$ of fuel to be injected for each combustion cycle of each cylinder 2 during the expansion stroke ESP. In other words, according to alternative embodiments, the overall quantity $Q_{fuel}$ of fuel to be injected for each combustion cycle of each cylinder 2 is divided into a contribution injected in the intake stroke INT and/or a contribution injected in the compression stroke COMP and/or a contribution injected in the expansion stroke ESP.

During a preliminary step, the value of the start of injection angle SOI is determined and stored in the control unit 16. According to a preferred variant, the value of the start of injection angle SOI is determined during a step of setting up and is kept constant; as the piston 3 is initially at top dead center PMS and descends to bottom dead center PMI in the intake stroke INT, an error of the value of the start of injection angle SOI by a few degrees (i.e. if the injection starts too soon) could be very dangerous because the piston 3 may still be too close to the injector 14 and the injected fuel may therefore foul the crown of the piston 3 itself or the walls of the cylinder 2.

Figure 4:
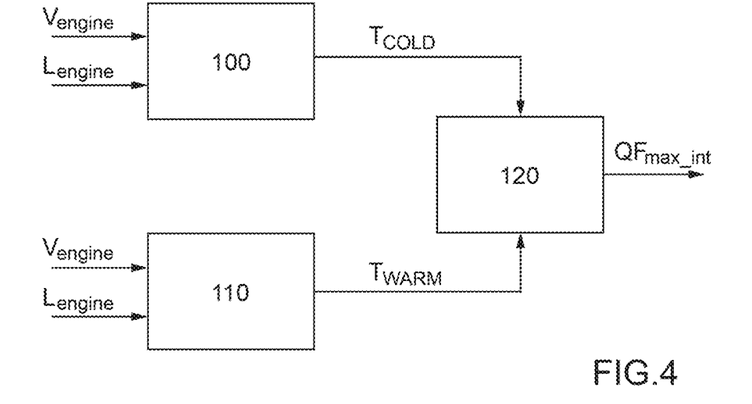
FIG. 4 is a block chart of the method to determine the injection pattern in the intake stroke object of the present invention.

As shown in FIG. 4, the control unit 16 is thus configured to determine the maximum quantity $T_{cold}$ of fuel for each partial injection during the intake stroke INT in cold temperature conditions and the maximum quantity $T_{warm}$ of fuel for each partial injection in the intake stroke INT in warm temperature conditions. In more detail, the value of the speed $V_{engine}$ of the internal combustion engine 1 and the load $L_{engine}$ of the internal combustion engine 1 are transmitted in input to both a calculation block 100 and a block 110.

Block 100 determines the maximum quantity $T_{cold}$ of fuel for each partial injection in the intake stroke INT in cold temperature conditions, i.e. at approximately 20° C., as a function of the speed $V_{engine}$ of the internal combustion engine 1 and of the load $L_{engine}$ of the internal combustion engine 1. In substance, a map is stored in the control unit 16, which map provides as result, as a function of the speed $V_{engine}$ of the internal combustion engine 1 and of the load $L_{engine}$ of the internal combustion engine 1, the maximum quantity $T_{cold}$ of fuel for each partial injection in the intake stroke INT in cold temperature conditions.

Block 110 determines the maximum quantity $T_{warm}$ of fuel for each partial injection in the intake stroke INT in warm temperature conditions, i.e. at approximately 90° C., as a function of the speed $V_{engine}$ of the internal combustion engine 1 and of the load $L_{engine}$ of the internal combustion engine 1. In substance, a map is stored in the control unit 16, which map provides as result, as a function of the speed $V_{engine}$ of the internal combustion engine 1 and of the load $L_{engine}$ of the internal combustion engine 1, the maximum quantity $T_{warm}$ of fuel for each partial injection in the intake stroke INT in warm temperature conditions.

It is worth noting that both the cold temperature (approximately 20° C.) and the warm temperature (approximately 90° C.) is the temperature of the internal combustion engine 1 in cold temperature conditions and in the hot temperature conditions; the temperature of the internal combustion engine 1 may be approximated to the temperature $T_{coolant}$ of the cooling fluid of the internal combustion engine 1.

The maximum quantity $T_{warm}$ of fuel for each partial injection in the intake stroke INT in warm temperature conditions and the maximum quantity $T_{cold}$ of fuel for each partial injection in the intake stroke INT in cold temperature conditions are transmitted in input to a calculation block 120 which determines the maximum quantity $QF_{max\_int}$ of fuel for each partial injection in the intake stroke INT. The maximum quantity $QF_{max\_int}$ of fuel for each partial injection in the intake stroke INT is calculated by means of a weighted mean of the maximum quantity $T_{warm}$ of fuel for each partial injection in the intake stroke INT in warm temperature conditions and of the maximum quantity $T_{cold}$ of fuel for each partial injection in the intake stroke INT in cold temperature conditions. The weights are represented by the distance of the current temperature $T_{coolant}$ of the cooling fluid of the internal combustion engine 1 from the reference temperatures, i.e. from the cold temperature (approximately 20° C.) and from the hot temperature (approximately 90° C.). According to a preferred embodiment, the weights of the maximum quantity $T_{warm}$ of fuel for each partial injection in the intake stroke INT in warm temperature conditions and of the maximum quantity $T_{cold}$ of fuel for each partial injection in cold temperature conditions in the intake stroke INT are established with linear dependence by the difference of the current temperature $T_{coolant}$ of the cooling fluid of the internal combustion engine 1 from the reference temperatures, i.e. from the cold temperature (approximately 20° C.) and from the warm temperature (approximately 90° C.). In other words, the contribution of the maximum quantity $T_{cold}$ of fuel for each partial injection in the intake stroke INT in cold temperature conditions is higher for current temperatures $T_{coolant}$ of the cooling fluid of the internal combustion engine 1 comprised in the 20° C.-55° C. range; the contribution of the maximum quantity $T_{warm}$ of fuel for each partial injection in the intake stroke INT in warm temperature conditions is higher for current temperatures $T_{coolant}$ of the cooling fluid of the internal combustion engine 1 comprised in the 55° C.-90° range; and the two contributions weigh in the same manner for the current temperature $T_{coolant}$ coolant of the cooling fluid of the internal combustion engine 1 equal to 55° C.

According to a further embodiment, the weights of the maximum quantity $T_{warm}$ of fuel for each partial injection in the intake stroke INT in warm temperature conditions and of the maximum quantity $T_{cold}$ of fuel for each partial injection in cold temperature conditions in the intake stroke INT are established with non-linear dependence by the difference of the current temperature $T_{coolant}$ of the cooling fluid of the internal combustion engine 1 from the reference temperatures, i.e. from the cold temperature (approximately 20° C.) and from the warm temperature (approximately 90° C.). In this case, the control unit 16 is thus configured to determine, respectively, the weights of the maximum quantity $T_{warm}$ of fuel for each partial injection in the intake stroke INT in warm temperature conditions and of the maximum quantity $T_{cold}$ of fuel for each partial injection in cold temperature conditions so as to increase the contribution of the maximum quantity $T_{warm}$ of fuel for each partial injection in the intake stroke INT in warm temperature conditions.

The control unit 16 is thus configured to determine the number of partial injections in the intake stroke INT by means of the following ratio:

$$Q_{fuel\_int}/i <= QF_{max\_int} \quad [1]$$

$Q_{fuel\_int}$ quantity of fuel to be injected for each four-stroke combustion cycle of each cylinder 2 in the intake stroke INT;

$QF_{max\_int}$ maximum quantity of fuel for each partial injection in the intake stroke INT; and number of partial injections to be performed in the intake stroke INT.

The control unit 16 is configured to proceed by trial and error to determine the number i of partial injections in the intake stroke INT until condition [1] occurs; the number i of partial injections in the intake stroke INT is comprised between one and a maximum value $N_{max\_int}$ which is determined in a preliminary step of setting up and tuning.

According to a preferred variant, once the number i of partial injections to be performed in the intake stroke INT is determined, the quantity $QF_{obj\_int}$ of fuel injected for each partial injection in the intake stroke INT is constant and equal, for each partial injection, to:

$$QF_{obj\_int} = Q_{fuel\_int}/i \quad [2]$$

$Q_{fuel\_int}$ quantity of fuel to be injected for each four-stroke combustion cycle of each cylinder 2 in the intake stroke INT;

$QF_{obj\_int}$ objective quantity of fuel for each partial injection in the intake stroke INT; and i number of partial injections to be performed in the intake stroke INT.

According to a preferred variant, the objective quantity $QF_{obj\_int}$ of fuel for each partial injection during the intake stroke INT is injected at regular intervals of time. In this manner, by keeping constant both the period of the partial injections and the objective quantity $QF_{obj\_int}$ of fuel for each partial injection in the intake stroke INT, the conditions previous to the partial injection itself are substantially restored for each partial injection in the cylinder 2 (e.g. in terms of air resistance to the passage of fuel, turbulence inside the cylinder 2, etc.).

The control unit 16 is thus configured to determine the period between two partial injections in the intake stoke INT as a function of the overall duration of the intake stroke INT, of the number of partial injections to be performed in the intake stroke INT and of the objective quantity $QF_{obj\_int}$ of fuel to be injected for each partial injection in the intake stroke INT. The period between two partial injections in the intake stroke INT is thus variable as a function of the speed $V_{engine}$ of the internal combustion engine 1, of the load $L_{engine}$ of the internal combustion engine 1 and of the temperature $T_{coolant}$ of the cooling fluid of the internal combustion engine 1 and of the start of injection angle SOI.

According to a further variant, the effective quantity $QF_{int}$ of fuel for each partial injection in the intake stroke INT is not constant and is not even injected at regular intervals of time. In particular, the control unit 16 is configured to determine a partial injection pattern according to which the effective quantity $QF_{int}$ of fuel injected for each partial injection in the intake stroke INT gradually either increases or decreases and the period of time elapsing between two subsequent partial injections gradually increases. In this manner, by increasing both the period elapsing between two subsequent partial injections and reducing the effective quantity $QF_{int}$ of fuel for each partial injection during the intake stroke INT, the conditions previous to the partial injection itself in the cylinder 2 for each partial injection can be substantially restored.

The choice of increasing or decreasing the effective quantity $QF_{int}$ of fuel injected for each partial injection in the intake stroke INT depends on the following two (mutually disagreeing) needs for which an optimization trade-off must be found in the various operating conditions of the internal combustion engine 1:

- since in the intake stroke INT the piston 3 descends from top dead center PMS to bottom dead center PMI and thus the distance of the piston 3 from the injector 14 decreases, it is possible to prevent the fuel from colliding against the crown of the piston 3 itself even by increasing the effective quantity $QF_{int}$ of fuel for each partial injection;
- as the mixture in the cylinder 2 becomes rich in fuel, the penetration resistance of the jet of mixture decreases, and therefore the quantity of fuel in each single injection must be reduced.

The strategy implemented by the control unit 16 to determine the number of partial injections, the quantity of fuel to be injected for each partial injection and the period between two subsequent partial injections during the compression stroke COMP is described below.

During a preliminary step, the value of the end of injection angle EOI is determined and stored in the control unit 16. According to a preferred variant, the value of the end of injection angle EOI is determined during a step of setting up and is kept constant; since, in the compression stroke COMP, the piston 3 is initially at bottom dead center PMI and rises to top dead center PMS, an error of the value of the end of injection angle EOI by a few degrees (i.e. if the injection ends too soon) could be very dangerous because the piston 3 may be already too close to the injector 14 and the injected fuel may therefore foul the crown of the piston 3 itself or the walls of the cylinder 2.

Figure 5:
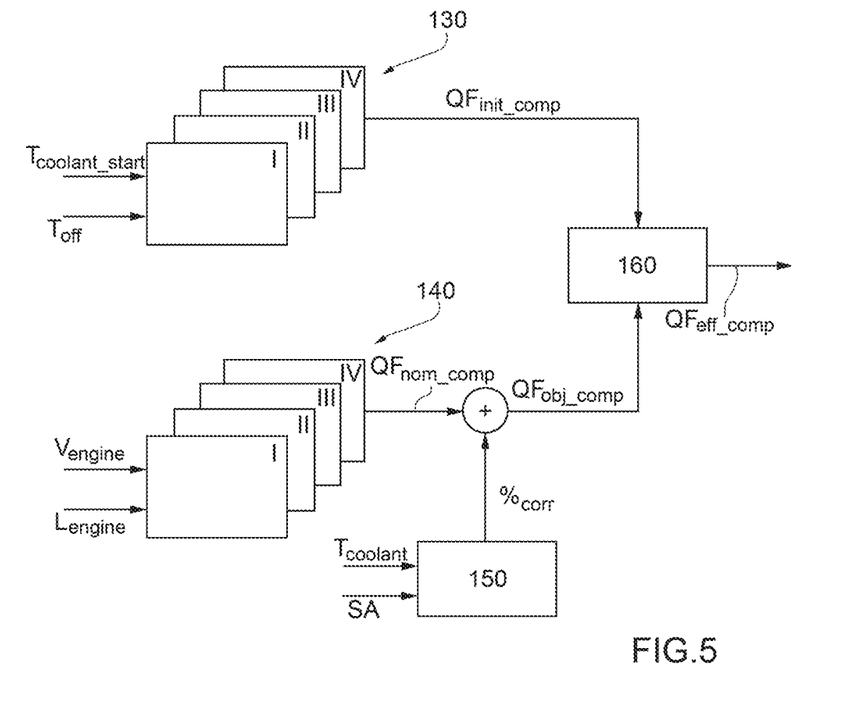
FIG. 5 is a block chart of the method to determine the injection pattern in the compression stroke object of the present invention.

As shown in FIG. 5, a series of maps 130 are stored in control unit 16. The number of maps 130 stored in the control unit 16 is equal to the maximum number $N_{max\_comp}$ of partial injections in the compression stroke COMP which is determined in a preliminary step of setting up and tuning. As shown in FIG. 5, four maps 130, which represent the maximum value of four partial injections in the compression stroke COMP, are stored in the control unit 16.

Each map 130 provides the initial quantity $QF_{init\_comp}$ of the fuel to be injected for a respective partial injection in the compression stroke COMP or a percentage with respect to the total fuel quantity to be injected in the compression stroke COMP, starting from which the aforesaid initial quantity $QF_{init\_comp}$ of the fuel to be injected for a respective partial injection in the compression stroke COMP can be determined.

The initial quantity $QF_{init\_comp}$ of fuel to be injected for a respective partial injection in the compression stroke COMP is determined as a function of two parameters. Such parameters are the temperature $T_{coolant\_start}$ of the cooling fluid when the internal combustion engine 1 is started and the off time $T_{off}$ of the internal combustion engine 1 (i.e. the interval of time for which the internal combustion engine 1 remains off).

Each map 130 thus provides, for the corresponding partial injection in the compression stroke COMP, the initial quantity $QF_{init\_comp}$ of fuel to be injected as a function of the temperature $T_{coolant\_init}$ of the cooling fluid when the internal combustion engine 1 is started and as a function of the off time $T_{off}$ of the internal combustion engine 1 (i.e. of the interval of time during which the internal combustion engine 1 remained off).

Again as shown in FIG. 5, a series of maps 140 are also stored in control unit 16. The number maps 140 stored in the control unit 16 is equal to the maximum number $N_{max\_comp}$ of partial injections in the compression stroke COMP and which is determined in a preliminary step of setting up and tuning. As shown in FIG. 5, four maps 140, which represent the maximum value of four partial injections in the compression stroke COMP, are stored in the control unit 16.

Each map 140 provides the nominal quantity $QF_{nom\_comp}$ of fuel to be injected for a respective partial injection in the compression stroke COMP or a percentage with respect to the total quantity of fuel to be injected in the compression stroke COMP, starting from which the aforesaid nominal quantity $QF_{nom\_comp}$ of fuel to be injected for a respective partial injection in the compression stroke COMP can be determined.

The nominal quantity $QF_{nom\_comp}$ of fuel to be injected for a respective partial injection in the compression stroke COMP is determined as a function of two parameters. Such parameters are the speed $V_{engine}$ of the internal combustion engine 1 and the load $L_{engine}$ of the internal combustion engine 1.

Each map 140 thus provides the nominal quantity $QF_{nom\_comp}$ of fuel to be injected as a function of the speed $V_{engine}$ of the internal combustion engine 1 and of the load $L_{engine}$ of the internal combustion engine 1 for the corresponding partial injection, in the compression stroke COMP.

According to a preferred variant, the nominal quantity $QF_{nom\_comp}$ of the fuel to be injected for a respective partial injection in the compression stroke COMP thus determined is corrected by means of a corrective contribution %$_{corr}$ for a respective partial injection in the compression stroke COMP. In particular, a map 150, which provides the corrective contribution %$_{corr}$ of fuel to be injected for a respective partial injection in the compression stroke COMP, is stored in the control unit 16. The corrective contribution %$_{corr}$ of fuel to be injected for a respective partial injection in the compression stroke COMP is determined as a function of two parameters. Such parameters are the temperature T$_{coolant}$ of the cooling fluid of the warm internal combustion engine 1 and the decay of the spark advance SA implemented by the internal combustion engine 1 with respect to the optimal spark advance (i.e. the spark advance which allows to generate the maximum torque).

The map 150 thus provides, for the corresponding partial injection in the compression stroke COMP, the corrective contribution %$_{corr}$ of fuel to be injected as a function of the temperature T$_{coolant}$ of the cooling fluid of the internal combustion engine 1 and of the decay of the spark advance SA implemented by the internal combustion engine 1.

The objective quantity QF$_{obj\_comp}$ of fuel to be injected for a respective partial injection in the compression stroke COMP is determined by adding the nominal quantity QF$_{nom\_comp}$ of the fuel to be injected for a respective partial injection in the compression stroke COMP and the corrective contribution %$_{corr}$ of fuel to be injected for a respective partial injection in the compression stroke COMP.

The objective quantity QF$_{obj\_comp}$ of fuel to be injected for a partial injection in the compression stroke COMP and the initial quantity QF$_{init\_comp}$ of fuel to be injected for a partial injection in the compression stroke COMP are transmitted in input to a calculation block 160 which determines the effective quantity QF$_{eff\_comp}$ of fuel to be injected for a specific partial injection in the compression stroke COMP.

Figure 6:
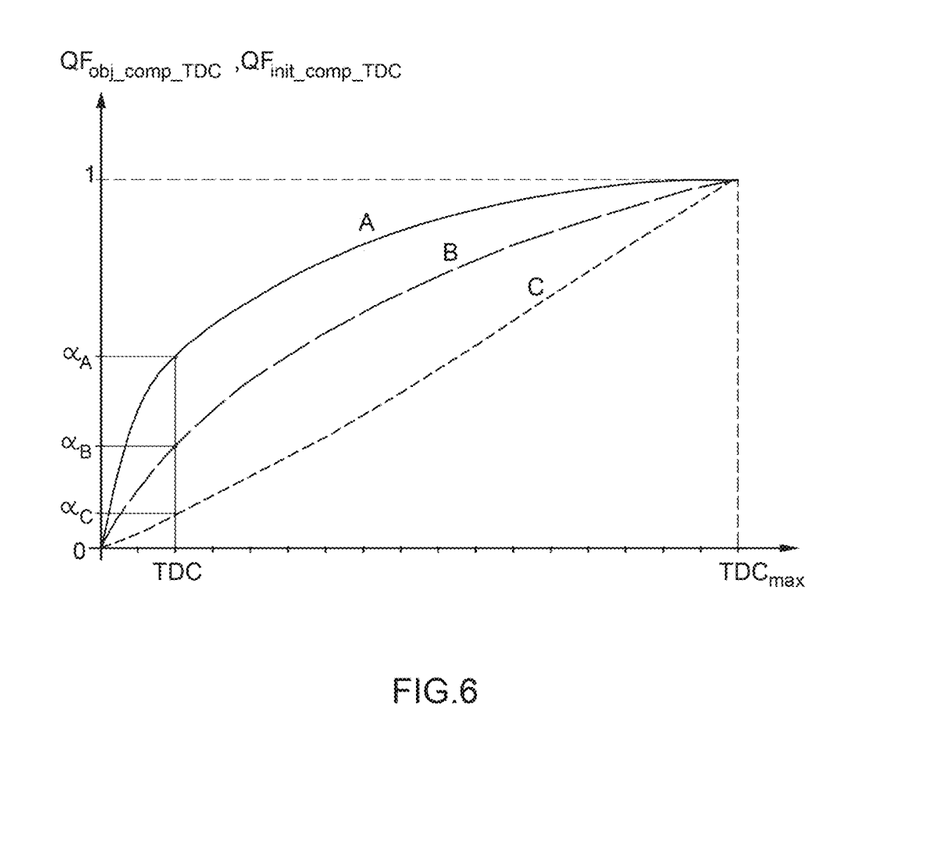
FIG. 6 is a chart used in the method in FIG. 5 to determine the injection pattern in the compression stroke; and FIGS. from 7 a) to 7 d) show the comparison between some partial injection patterns to be implemented in the compression stroke obtained by means of the method in FIG. 5.

In particular, FIG. 6 shows a chart used for calculating the effective quantity QF$_{eff\_comp}$ of fuel to be injected for a specific partial injection in the compression stroke COMP.

A series of curves A, B, C, significant of the evolution over time of the effective quantity QF$_{eff\_comp}$ of fuel to be injected for a specific partial injection in the compression stroke COMP, are stored in the control unit 16. The curve A, B, C is chosen as a function of the temperature T$_{coolant\_init}$ of the cooling fluid when the internal combustion engine 1 is started; in other words, every curve A, B, C is indicative of the operation in the compression stroke COMP at a given temperature T$_{coolant\_init}$ of the cooling fluid when the internal combustion engine 1 is started.

The control unit 16 is suited to determine the effective quantity QF$_{eff\_comp}$ of the fuel to be injected for a specific partial injection in the compression stroke COMP by means of the following formula:

$$QF_{eff\_comp\_TDC} = \alpha * QF_{obj\_comp\_TDC} + (1-\alpha) * QF_{init\_comp\_TDC} \quad [3]$$

QF$_{eff\_comp\_TDC}$ effective quantity of fuel to be injected for a specific partial injection in the compression stroke COMP;

QF$_{obj\_comp\_TDC}$ objective quantity of fuel to be injected for a specific partial injection in the compression stroke COMP;

QF$_{init\_comp\_TDC}$ initial quantity of fuel to be injected for a specific partial injection in the compression stroke COMP; and α weight comprised between 0 and 1 to be assigned to the objective quantity of fuel to be injected for a specific partial injection in the compression stroke COMP.

The number of partial injections in the compression stroke COMP to be taken into consideration is comprised between zero and a maximum number TDC$_{max}$ of partial injections in the compression stroke COMP. The equation [3] is verified for each partial injection in the compression stroke COMP (comprised between zero and a maximum number TDC$_{max}$ of partial injections in the compression stroke COMP).

Initially, the effective quantity QF$_{eff\_comp}$ of fuel to be injected for a specific partial injection in the compression stroke COMP will substantially coincide with the initial quantity QF$_{init\_comp}$ of fuel to be injected for a specific partial injection in the compression stroke COMP and will evolve so that, at the maximum number TDC$_{max}$ of partial injections in the compression stroke COMP, the effective quantity QF$_{eff\_comp}$ of fuel to be injected for a specific partial injection in the compression stroke COMP substantially coincides with the objective quantity QF$_{obj\_comp}$ of fuel to be injected for a partial injection in the compression stroke COMP.

In other words, the control unit is configured to make a weighted mean of the objective quantity QF$_{obj\_comp\_TDC}$ of fuel to be injected for a specific partial injection in the compression stroke COMP and of the initial quantity QF$_{init\_comp\_TDC}$ of fuel to be injected in the compression stroke COMP to establish the effective quantity QF$_{eff\_comp\_TDC}$ of fuel to be injected for a specific partial injection in the compression stroke COMP; in which the weight α$_A$, α$_B$, α$_C$ of the objective quantity QF$_{obj\_comp\_TDC}$ of fuel to be injected for a specific partial injection in the compression stroke COMP is determined by means of the respective curve A, B, C shown in the chart in FIG. 6 and the weight of the initial quantity QF$_{init\_comp\_TDC}$ to be injected for a specific partial injection in the compression stroke COMP is calculated as the completion to 1 of the respective weight α$_A$, α$_B$, α$_C$ of the objective quantity QF$_{obj\_comp\_TDC}$ of fuel to be injected for a specific partial injection in the compression stroke COMP.

Figure 7:
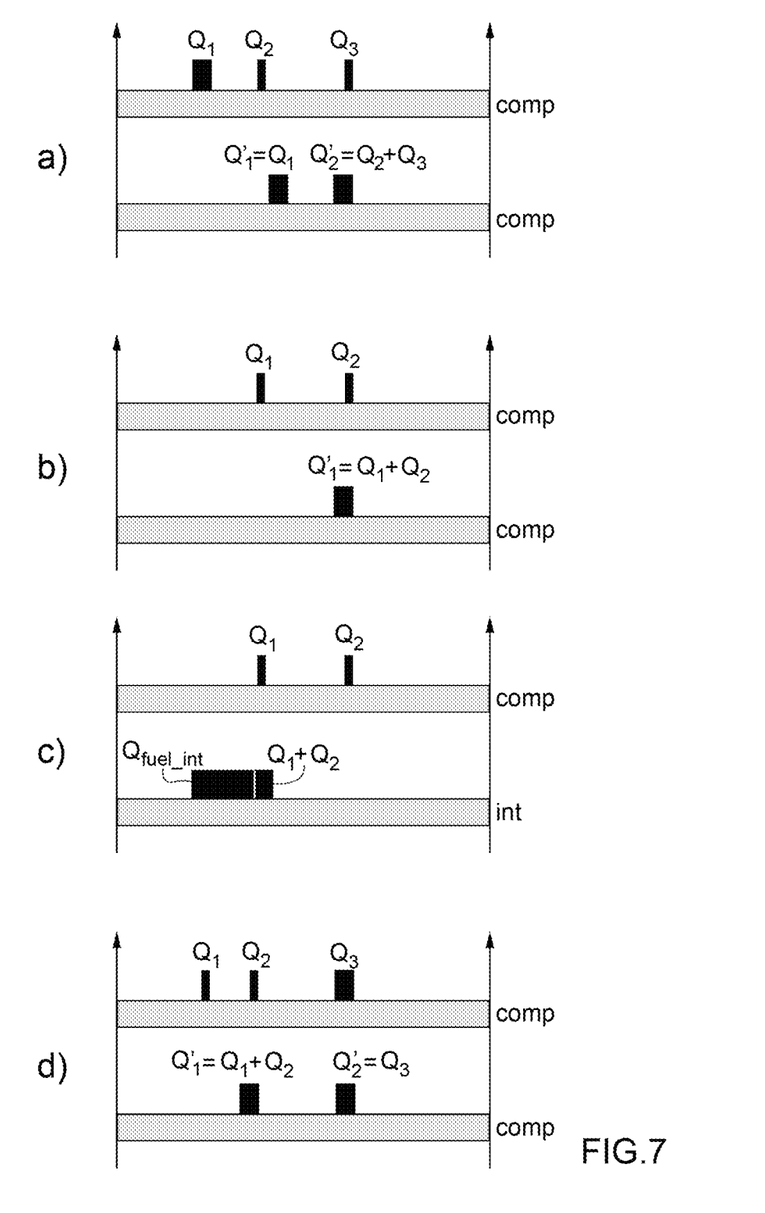

According to a further variant, the chart shown in FIG. 7 is constructed so as to provide the weight β (comprised between 0 and 1) to be attributed to the initial quantity QF$_{init\_comp\_TDC}$ of fuel to be injected for a specific partial injection in the compression stroke COMP.

Furthermore, it is worth noting that map 130, according to which the initial quantity QF$_{init\_comp}$ of fuel to be injected for a respective partial injection in the compression stroke COMP is determined, and map 140, according to which the nominal quantity QF$_{nom\_comp}$ of fuel to be injected for a respective partial injection in the compression stroke COMP is determined, can provide values higher than or equal to zero. This means that, for specific partial injections in the compression stroke COMP, the effective quantity QF$_{eff\_comp\_TDC}$ of fuel to be injected may be zero. In this case, the number of partial injections in the compression stroke COMP is lower than the maximum number N$_{max\_comp}$ of partial injections in the compression stroke COMP which is determined in a preliminary step of setting up and tuning. In other words, as shown in FIG. 7, the number of partial injections in the compression stroke COMP may be any number from 0 to 4, which is equal to maximum number N$_{max\_comp}$ of partial injections in the compression stroke COMP.

As described hereto, an objective pattern of partial injections to be implemented in the compression stroke COMP for each four-stroke combustion cycle of each cylinder 2 can be determined as a function of the request of torque C to be delivered.

Having determined the objective pattern of partial injections to be implemented in the compression stroke COMP for each combustion cycle of each cylinder 2, the control unit 16 is thus configured to determine the period between two partial injections in the compression stroke COMP. In particular, the control unit 16 is provided so that an interval of time elapses between two subsequent partial injections j, j+1 in the compression stroke COMP, which interval of time is variable as a function of the effective quantity $QF_{eff\_comp}$ of fuel injected in the partial injection j which allows to restore substantially the conditions previous to the partial injection j itself in the cylinder 2 (e.g. in terms of air resistance to the passage of fuel, turbulence in the cylinder 2, etc.). The period between two partial injections in the compression stroke COMP is variable as a function of the speed $V_{engine}$ of the internal combustion engine 1, of the load $L_{engine}$ of the internal combustion engine 1 and of the temperature $T_{coolant}$ of the cooling fluid of the internal combustion engine 1 and, possibly, of the end of injection angle EOI.

The control unit 16 is further configured to determine the minimum quantity $QF_{min\_comp}$ of fuel to be injected for each partial injection in the compression stroke COMP; such a minimum quantity $QF_{min\_comp}$ of fuel to be injected for each partial injection in the compression stroke COMP is variable as a function of the feeding pressure upstream of the injector 14 and represents the quantity for which the injector 14 can guarantee the injections in repeatable and controlled manner.

The effective pattern of partial injections to be performed in the compression stroke COMP can be determined as a function of the objective pattern of partial injections to be performed during the compression stroke COMP for each combustion cycle of each cylinder 2 and the minimum quantity $QF_{min\_comp}$ to be injected for each partial injection in the compression stroke COMP.

In particular, the following situations which are partially illustrated in FIG. 7 may occur.

If the effective quantity $QF_{eff\_comp\_TDC}$ of fuel to be injected for each partial injection in the objective pattern of partial injections to be performed in the compression stroke COMP is higher than the minimum quantity $QF_{min\_comp}$ of fuel to be injected for each partial injection in the compression stroke COMP, the objective pattern of partial injections to be performed in the compression stroke COMP will coincide with the actual pattern of partial injections to be implemented in the compression stroke COMP.

As shown in FIG. 7 a), the objective pattern of partial injections to be performed in the compression stroke COMP includes three partial injections; in which the effective quantity $Q_1$ of fuel to be injected in the first partial injection is higher than the minimum quantity $QF_{min\_comp}$ of fuel to be injected for each partial injection in the compression stroke COMP, while the effective quantity $Q_2$ of fuel to be injected in the second partial injection and the effective quantity $Q_3$ of fuel to be injected in the third partial injection are lower than the minimum quantity $QF_{min\_comp}$ of fuel to be injected for each partial injection in the compression stroke COMP and the sum of the effective quantity $Q_2$ of fuel to be injected in the second partial injection and of the effective quantity $Q_3$ of fuel to be injected in the third partial injection is higher than the minimum quantity $QF_{min\_comp}$ of fuel to be injected for each partial injection in the compression stroke COMP.

The effective pattern of partial injections to be performed in the compression stroke COMP includes two partial injections; in which the effective quantity $Q'_1$ of fuel to be injected in the first partial injection is equal to the first effective quantity $Q_1$ of fuel to be injected in the first partial injection and the effective quantity $Q'_2$ of fuel to be injected in the second partial injection is equal to the sum of the effective quantity $Q_2$ of fuel to be injected in the second partial injection of the objective pattern and of the effective quantity $Q_3$ of fuel to be injected in the third partial injection of the objective pattern.

In the case in hand, with respect to the objective pattern of partial injections, the end of injection angle EOI, the quantity $Q_{fuel\_comp}$ of fuel injected as a whole in the compression stroke COMP and the interval of time elapsing between the first partial injection $Q_1$, $Q'_1$ and the second partial injection $Q_2$, $Q'_2$ can be kept unchanged in the effective pattern of partial injections.

As shown in FIG. 7 b), the objective pattern of partial injections to be performed in the compression stroke COMP includes three partial injections; in which both the effective quantity $Q_1$ of fuel to be injected in the first partial injection and the effective quantity $Q_2$ of fuel to be injected in the second partial injection are lower than the minimum quantity $QF_{min\_comp}$ of fuel to be injected for each partial injection in the compression stroke COMP and the sum of the effective quantity $Q_1$ of fuel to be injected in the first partial injection and of the effective quantity $Q_2$ of fuel to be injected in the second partial injection is higher than the minimum quantity $QF_{min\_comp}$ of fuel to be injected for each partial injection in the compression stroke COMP.

The effective pattern of partial injections to be performed in the compression stroke COMP includes only one injection; wherein the effective quantity $Q'_1$ of fuel to be injected in the first injection is equal to the effective quantity $Q_1$ of fuel to be injected in the first objective pattern and to the effective quantity of fuel $Q_2$ to be injected in the second partial injection of the objective pattern.

With respect to the objective pattern of partial injections, in the effective pattern of partial injections of the case in hand both the end of injection angle EOI and the quantity $Q_{fuel\_comp}$ of fuel injected as a whole in the compression stroke COMP can be kept.

As shown in FIG. 7 c), the objective pattern of partial injections to be performed in the compression stroke COMP includes two partial injections; in which both the effective quantity $Q_1$ of fuel to be injected in the first partial injection and the effective quantity $Q_2$ of fuel to be injected in the second partial injection are lower than the minimum quantity $QF_{min\_comp}$ of fuel to be injected for each partial injection in the compression stroke COMP and the sum of the effective quantity $Q_1$ of fuel to be injected in the first partial injection and of the effective quantity $Q_2$ of fuel to be injected in the second partial injection is lower than the minimum quantity $QF_{min\_comp}$ of fuel to be injected for each partial injection in the compression stroke COMP.

The actual pattern of partial injections to be performed in the compression stroke COMP does not include any injection; the sum of the effective quantity $Q_1$ of fuel to be injected in the first partial injection of the objective pattern and of the effective quantity $Q_2$ of fuel to be injected in the second partial injection of the objective pattern is injected in the intake stroke INT.

With respect to the objective pattern of partial injections, in the examined effective pattern of partial injections the quantity $QF_{fuel}$ of fuel injected as a whole in the combustion cycle can be kept unchanged.

As shown in FIG. 7 d), the objective pattern of partial injections to be performed in the compression stroke COMP includes three partial injections; in which both the effective quantity $Q_1$ of fuel to be injected in the first partial injection and the effective quantity $Q_2$ of fuel to be injected in the second partial injection are lower than the minimum quantity $QF_{min\_comp}$ of fuel to be injected for each partial injection in the compression stroke COMP, while the effective quantity $Q_3$ of fuel to be injected in the third partial injection is higher than the minimum quantity $QF_{min\_comp}$ of fuel to be injected for each partial injection in the compression stroke COMP and the sum of the effective quantity $Q_1$ to be injected in the first partial injection and of the effective quantity $Q_2$ of fuel to be injected in the second partial injection is higher than the minimum quantity $QF_{min\_comp}$ of fuel to be injected for each partial injection in the compression stroke COMP.

The effective pattern of partial injections to be performed in the compression stroke COMP includes two partial injections; in which the effective quantity $Q'_1$ of fuel to be injected in the first injection is equal to the sum of the effective quantity $Q_1$ of fuel to be injected in the first partial injection and the effective quantity $Q_2$ of fuel to be injected in the second partial injection of the objective pattern and the effective quantity $Q'_2$ of fuel to be injected in the second injection is equal to the effective quantity $Q_3$ of fuel to be injected in the third partial injection of the objective pattern.

In the case in hand, with respect to the objective pattern of partial injections, both the end of injection angle EOI and the quantity $Q_{fuel\_comp}$ of duel injected as a whole in the compression stroke COMP (but not the interval of time elapsing between the first partial injection $Q_1$, $Q'_1$ and the second partial injection $Q_2$, $Q'_2$) can be kept unchanged in the effective pattern of partial injections.

According to a preferred variant, the control unit 16 is configured to determine the overall quantity $QF_{fuel}$ of fuel to be injected for each four-stroke combustion cycle of each cylinder 2 as a function of the request for torque C to be delivered which determines the quantity of air which must be aspirated by the engine. Having determined the overall quantity $QF_{fuel}$ of fuel to be injected for each four-stroke combustion cycle of each cylinder 2, the control unit 16 is configured to determine the effective pattern of partial injections to be performed during the compression stroke COMP according to the previous description. The quantity $Q_{fuel\_int}$ of fuel to be injected for each four-stroke combustion cycle of each cylinder 2 in the intake stroke INT is then calculated by means of the difference between the overall quantity $Q_{fuel}$ to be injected for each four-stroke combustion cycle of each cylinder 2 and the quantity $QF_{fuel\_comp}$ of fuel to be injected for each four-stroke combustion cycle of each cylinder 2 in the compression stroke COMP.

According to a further variant, a quantity $Q_{fuel\_esp}$ of fuel can be injected in the expansion stroke ESP as a function of the decay of the spark advance SA performed by the internal combustion engine 1; in particular, a quantity $QF_{fuel\_esp}$ of fuel can be substantially injected in the instance in which the spark plug is controlled to produce a spark.

It is worth noting that the strategy implemented by the control unit 16 to determine the number of partial injections, the quantity of fuel to be injected for each partial injection and the period between two subsequent partial injections during the compression stroke COMP and the strategy implemented by the control unit 16 to determine the number of partial injections, the quantity of fuel to be injected for each partial injection and the period between two subsequent partial injections during the intake stroke INT are completely and mutually independent.

The strategies implemented by the control unit 16 described hereto have many advantages. Firstly, the strategies described above are applied in individual manner to each cylinder 2; in this manner, it is possible to take into account the inevitable differences which exist between the various cylinders 2 by effect of manufacturing tolerances and by effect of the difference of temperature of the walls of the cylinders 2 due to the different positions of the cylinders 2 in the internal combustion engine 1. Secondly, the strategies described above are simple and cost-effective to implement in a control unit 16 of an internal combustion engine 1 because they do not require any physical change, employ a moderate calculating capacity of the control unit 6 and at the same time allow to optimize the thermodynamics of the combustion with evident benefits on consumptions and containment of polluting emissions.

The invention claimed is:

1. A method for determining an injection pattern in an intake stroke (INT) of a combustion cycle of cylinders (2) of a direct-injection internal combustion engine (1), said method comprising the steps of:

determining an overall quantity ($Q_{fuel}$) of fuel to be injected for each combustion cycle of each cylinder (2) to satisfy a request for torque (C) to be delivered;

determining a quantity ($Q_{fuel\_int}$) of fuel to be injected for each combustion cycle of each cylinder (2) during the intake stroke (INT) as a function of the overall quantity ($Q_{fuel}$) of fuel to be injected for each combustion cycle of each cylinder (2);

determining a maximum quantity ($QF_{max\_int}$) of fuel to be injected for each partial injection in the intake stroke (INT) as a function of a speed ($V_{engine}$) of the internal combustion engine (1), of a load ($L_{engine}$) of the internal combustion engine (1), and of a value of the start of injection angle (SOI); and determining the injection pattern in the intake stroke (INT) as a function of the quantity ($Q_{fuel\_int}$) of fuel to be injected for each combustion cycle of each cylinder (2) during the intake stroke (INT) and of the maximum quantity ($QF_{max\_int}$) of fuel to be injected for each partial injection during the intake stroke (INT), which further includes the sub-steps of:

determining an objective quantity ($QF_{obj\_int}$) of fuel to be injected for each partial injection in the intake stroke (INT) by determining a ratio between the quantity ($Q_{fuel\_int}$) of fuel to be injected for each combustion cycle of each cylinder (2) during the intake stroke (INT) and a number of partial injections to be performed in the intake stroke (INT);

determining the number of partial injections (i) to be performed in the intake stroke (INT) so that the ratio between the quantity ($Q_{fuel\_int}$) of fuel to be injected for each combustion cycle of each cylinder (2) during the intake stroke (INT) and the number (i) of partial injections to be performed in the intake stroke (INT) is either lower than or equal to the maximum quantity ($QF_{max\_int}$) of fuel to be injected for each partial injection in the intake stroke (INT);

wherein the maximum quantity ($QF_{max\_int}$) of fuel to be injected for each partial injection in the intake stroke (INT) is calculated as a function of a maximum quantity ($T_{warm}$) of fuel to be injected for each partial injection in the intake stroke (INT) when the internal (1) combustion engine is at least 90° C., and as a function of a maximum quantity ($T_{cold}$) of fuel to be injected for each partial injection in the intake stroke (INT) when the internal (1) combustion engine is at 20° C. or less;

determining the maximum quantity ($T_{warm}$) of fuel to be injected for each partial injection in the intake stroke (INT) when the internal combustion engine (1) is at least 90° C. as a function of the speed ($V_{engine}$) of the internal combustion engine (1) and of the load ($L_{engine}$) of the internal combustion engine (1);

determining the maximum quantity ($T_{cold}$) of fuel to be injected for each partial injection in the intake phase (INT) when the internal combustion engine (1) is 20°

C. or less as a function of the speed ($V_{engine}$) of the internal combustion engine (1) and of the load ($L_{engine}$) of the internal combustion engine (1); and calculating the maximum quantity ($QF_{max\_int}$) of fuel to be injected for each partial injection in the intake stroke (INT) as a weighted mean between the maximum quantity ($T_{warm}$) of fuel to be injected for each partial injection in the intake stroke (INT) when the internal combustion engine (1) is at least 90° C. and the maximum quantity ($T_{cold}$) of fuel to be injected for each partial injection in the intake stroke (INT) when the internal (1) combustion engine is 20° C. or less.

2. The method according to claim 1, wherein an amount of time elapsing between two subsequent partial injections of the intake stroke (INT) is constant.

3. The method according to claim 1, wherein the objective quantity ($QF_{obj\_int}$) of fuel to be injected for each partial injection in the intake stroke (INT) progressively either increases or decreases and an amount of time elapsing between two subsequent partial injections of the intake stroke (INT) progressively increases.

4. The method according to claim 1, wherein the weighted mean for calculating the maximum quantity ($QF_{max\_int}$) of fuel to be injected for each partial injection in the intake stroke (INT) is determined as a function of the distance of the current temperature of the internal combustion engine (1) from 20° C. or less, and from at least 90° C., respectively.

5. The method according to claim 1, wherein a temperature of the internal combustion engine (1) is equal to a temperature ($T_{coolant}$) of a cooling fluid of the internal combustion engine (1).

6. The method according to claim 1 and comprising the further steps of:

determining, as a function of the overall quantity ($Q_{fuel}$) of fuel to be injected for each combustion cycle of each cylinder (2), a quantity ($Q_{fuel\_comp}$) of fuel to be injected for each combustion cycle of each cylinder (2) during a compression stroke (COMP) and/or a quantity ($Q_{fuel\_esp}$) of fuel to be injected for each combustion cycle of each cylinder (2) during an expansion stroke (ESP);

determining the quantity ($Q_{fuel\_int}$) of fuel to be injected for each combustion cycle of each cylinder (2) during the intake stroke (INT) as a function of the difference between the overall quantity ($Q_{fuel}$) of fuel to be injected for each combustion cycle of each cylinder (2) and the quantity ($Q_{fuel\_comp}$) of fuel to be injected for each combustion cycle of each cylinder (2) during the compression stroke (COMP) and/or the quantity ($Q_{fuel\_esp}$) of fuel to be injected for each combustion cycle of each cylinder (2) during the expansion stroke (ESP).

* * * * *